Dec. 11, 1934.    J. E. ANDERSON    1,983,589
METHOD OF PREPARING AND APPLYING PLASTIC REFRACTORY
Filed Aug. 8, 1932
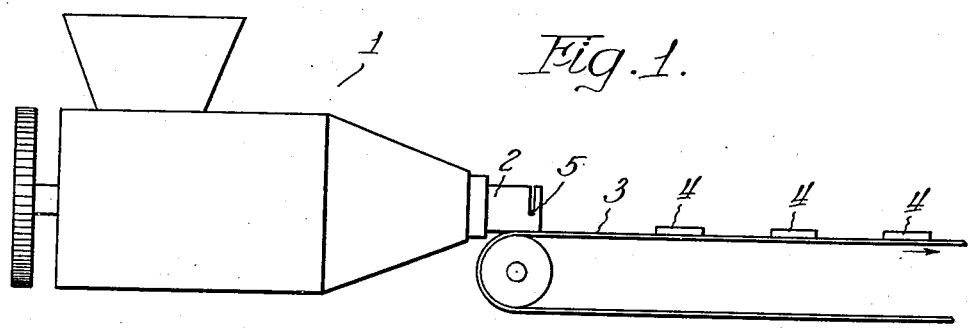
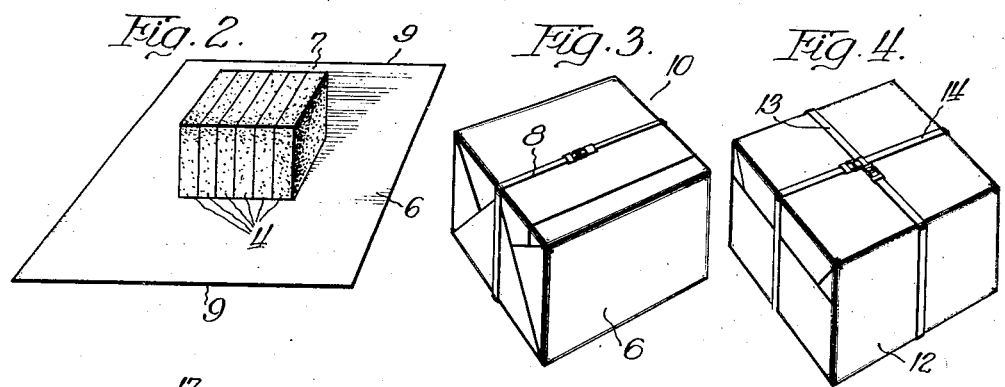
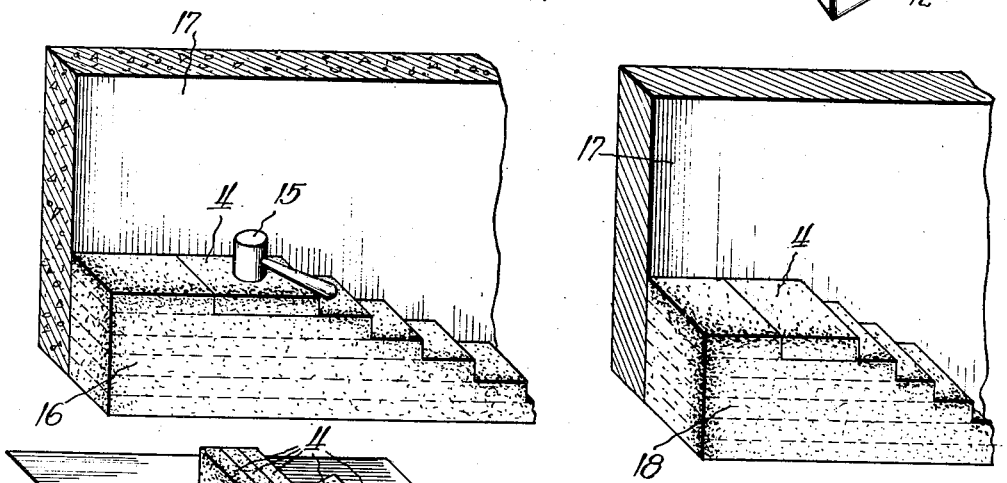
Inventor:
John E. Anderson.
By Brown, Jackson, Boettcher & Dienner
Attys.

Patented Dec. 11, 1934

1,983,589

UNITED STATES PATENT OFFICE 1,983,589

METHOD OF PREPARING AND APPLYING PLASTIC REFRACTORY

John E. Anderson, Chicago, Ill., assignor to Plibrico Jointless Firebrick Company, Chicago, Ill., a corporation of Illinois Application August 8, 1932, Serial No. 627,853

8 Claims. (Cl. 25—156)

The present invention relates to a method and means for preparing and applying plastic refractory for forming fire resisting walls, linings, arches and the like.

Plastic refractory material has come into general use for lining furnaces, arches and the like. As heretofore supplied, this material has been packaged in bulk in a metallic container or drum. The drum is substantially air tight and moisture tight, and it tends to maintain the material in a suitable plastic condition for application to the wall or surface to which it is to be applied. I find that there is a distinct advantage in keeping such material in a relatively tight container for a period of time after its preparation, in order to secure an aging effect which permits the moisture content to be thoroughly diffused throughout the mass, thereby increasing its plasticity without increase of moisture content.

The handling of these drums with a relatively large mass of refractory material therein is difficult because of the weight and size of the same, and in order to apply the plastic from the drum to the job, it is necessary that the mass be cut or broken into pieces small enough to be readily handled and applied. The material is of a stiffness such as to require tamping to bond detached pieces together.

In the prior practice, it is necessary to cut or break the mass from the drums into suitable pieces or chunks, apply these to the wall, and to shape them and tamp them together.

I have conceived the desirability of preforming the plastic material into sizes and shapes suitable for direct application to a wall and to each other, and delivering these in suitable condition directly to the user. The advantages gained by this procedure are striking. By forming rectangular slabs of suitable dimensions for example 2" x 9" x 12", these slabs can be applied directly to the wall and tamped into bonding engagement successively without the necessity for shaping or cutting the plastic material from a large unwieldy mass. The building of the wall can be performed more expeditiously and efficiently by the use of preformed slabs; the material can be handled to better advantage, and a more uniform application is possible. In order to deliver the slabs to the user at the place of use in proper condition for immediate application, I have conceived the desirability of assembling in a relatively small pile a number of these slabs to form a suitable package that can be conveniently carried by a workman, and can conveniently be passed through a firebox door or the like, and delivered at the spot where the wall or lining is being constructed.

The delivery of these slabs without adverse change in their plasticity or moisture content, and without change or deformation in shape, is accomplished, according to my invention, by immediately sealing the slabs in a substantially air and moisture tight wrapper, and supporting the same in a rectangular box closely fitting the pile of slabs. The moisture retaining wrapper serves the same purpose which the metal drum had previously served in permitting thorough diffusion of the moisture content of the plastic mass of the various slabs, tending to equalize and render uniform their moisture content, and bring the same to a maximum plasticity for a given moisture content. The rectangular containing box which fits the pile of slabs quite closely holds them in shape, and prevents deformation. The pile is made small enough that the slabs do not bond together in the package during handling or when allowed to stand for a period of time, and the package is, at the same time, of not excessive weight for a workman to handle.

The box may be a stiff cardboard or the like carton, and the package is relatively inexpensive, the container being destroyed readily as the package is opened.

Heretofore, where the plastic has been shipped en masse in a sheet metal container, it has been the custom to open the container outside the firebox or the like, and there cut the mass into suitable slabs or pieces which are passed to the workman within the firebox or other enclosure. This has resulted in excessive handling, undue labor costs, and disadvantageous application of the material.

According to my invention, the package itself is passed into the firebox or other enclosure, and the preformed slabs taken from the package and applied directly to the wall with minimum handling and breakage, and with a maximum of convenience and ease in applying the material and tamping the same to bond.

Walls of the type referred to are generally built in certain definite thicknesses. In certain furnaces, a nine inch wall of refractory is standard, and in others, a twelve-inch wall of refractory is standard. In the preferred practice of my invention, the slabs are formed of a thickness suitable for tamping to bond, and of lateral dimensions such as to be formed either into one standard wall thickness or a different standard wall thickness. For example, the block or slab may be 9" x 12" in lateral dimensions, and two inches in thickness. I do not intend to be limited to these dimensions, but I have found that they are highly satisfactory, and the idea of making the slabs oblong, so as to lay them into either of two wall thicknesses, is a distinct feature of advantage. Obviously, the slabs may be cut to smaller sizes when that is desirable.

In order to acquaint those skilled in the art with the manner of practicing my invention, I shall describe, in connection with the accompanying drawing, a specific embodiment of the same.

Figure 1 diagrammatically illustrates the extrusion of a stream of the plastic material after it has been suitably tempered, and illustrates the cutting of slabs from the stream;

Figure 2 illustrates the piling together of a number of these slabs in contact with each other, preparatory to wrapping them in a moisture retaining wrapper;

Figure 3 shows the group of slabs, for example, six in number, enclosed within the moisture retaining wrapper;

Figure 4 is a perspective view of the finished package ready for shipment and delivery to the user;

Figure 5 shows the method of application of the slabs in forming a wall or lining for the furnace with the slabs laid with their minimum lateral dimension forming the thickness of the wall; and Figure 6 is a similar illustration showing the slabs as applied to the formation of a wall where the greater lateral dimension of the slab defines the thickness of the wall or lining.

Referring now to the drawing in detail, Figure 1 shows an auger mill 1, which is of any suitable type for extruding a stream 2 of the plastic refractory therefrom. This plastic refractory is first kneaded and tempered in a pug mill or other suitable means to form a stiff, substantially homogeneous plastic mass. The stream 2 is squirted out upon a conveyor or belt 3, and is cut off into slabs 4—4, such cutting operation being illustrated at 5. The slabs are shown as being cut off one at a time, as the stream issues, but I may direct the solid stream upon the conveyor and then, by a special wire cutting machine, cut four slabs at a time. The extrusion and cutting of a stream of plastic is well known, in a general way, and follows the practice in the brick industry to which reference is made. In the operation illustrated the conveyor 3 runs faster than the stream 2 in order to separate the slabs 4—4.

The slabs 4—4 are of a suitable thickness to adapt them to being tamped together to bond without undue spreading, as will be explained later. I have found that a suitable dimension for a material such as is used in making fire brick or refractory lining to be two inches. I do not intend to be limited to this dimension, but mention the same as a suitable dimension to be employed in the practice of my invention. The slabs 4—4 are substantially rectangular, being cut from a rectangular stream 2, and their lateral dimensions are, for example, 9″ x 12″. These dimensions, obviously, may be varied if desired. The slabs 4—4 are substantially self-sustaining, being of a plasticity approximately like a green stiff mud brick before drying. These slabs are taken from the conveyor and are set together on edge, as shown in Figure 2, upon a sheet of moisture retaining paper, for example, oiled paper, vegetable parchment, or the like. The sheet 6 is large enough to fold over and form a substantially moisture and air tight wrapper about the mass or pile 7 of slabs. As shown in Figure 2, six slabs have thus been piled together to form a suitable sized package, and they weigh, when of the dimensions above given, approximately 100 pounds. This forms a package which is of a convenient size for handling. It is small enough to be passed through a furnace door and is not too heavy to be handled by an individual workman.

In Figure 3 I have shown the moisture retaining wrapper folded in place in close contact with the pile of slabs, and this wrapper is held in place by a flat metal strap, binder, or band 8, passed around the slabs 4—4 in such a direction as to hold them together, and also in such a direction as to hold the folded ends of the moisture retaining wrapper 6. The wrapper 6 is applied and folded in such a manner as to bring the joint between the edges 9, 9 of the wrapper 6 transversely of the slabs 4, 4, and lengthwise of the strap or band 8. This brings the folded ends of the wrapper 6 under the band 8, as is clearly shown in Figure 3. The package thus formed and shown in Figure 3 is then disposed in a rectangular box which may be formed of stiff cardboard suitably stapled, or otherwise secured together, to give a support to the package 10 on all sides. Box 12 may be formed of any other material suitable for closely fitting the package 10, and retaining the shape thereof. The box 12 with the package therein is closed, and the closure thereof retained by two crossed straps or bands of metal 13 and 14. The package is then shipped to the user. While in storage and in transit, the retention of the slabs within the moisture proof or moisture retaining wrapper 6 serves a highly useful purpose in permitting a thorough diffusion of moisture throughout the blocks and slabs 4, 4, to give them maximum plasticity without increase of moisture content. When the package is delivered at the place of forming the wall, it is opened. The box is removed or may be merely torn apart, and the slabs or blocks 4, 4 retained upon the moisture retaining wrapper 6, which is folded out as shown in Figure 5, at the place where the slabs are to be applied, thereby avoiding excessive handling and avoiding breakage. Also by unfolding the wrapper 6, a suitable working surface, clear of debris, dirt, etc. is formed. The blocks 4, 4 are then laid one at a time and tamped down to bond, as by means of the mallet 15 or other suitable tamping tool. The depth or thickness is small enough to limit lateral expansion when the blocks are tamped so that the thickness of the wall into which they are built is satisfactorily controlled by the initial transverse dimension of the slabs. The slabs are thereby bonded by tamping to form a solid wall 16, which may be a lining for the inside of a furnace wall, such as 17. Obviously, instead of being built into a flat, vertical wall, these slabs may be built into an arch or any other shape desired. The plastic slabs have the advantage of being capable of being laid into the shape of a rectangular wall by superposition, and due to their plasticity they may be tamped out of rectangular shape as soon as they are applied, as in forming an arch or the like. After the wall or lining is formed, it is of course subjected to the heat of the furnace, and such heat of the furnace fires and hardens the same. Due to the uniformity of the slabs before they are applied, and the tendency to equalize plasticity and moisture content while in the package, and due to the fact that they are tamped together in a monolithic structure, the firing of the wall or lining, and the burning or hardening of the same is accomplished with minimum cracking or checking.

In Figure 6 I have shown the blocks 4, 4 laid with their major dimensions forming the thickness of the wall. Thereby the wall is made thicker than in the case of the wall shown in Figure 5, where the blocks are made with their major dimensions lengthwise of the wall. The wall 16 of Figure 5 is, when blocks of 2" x 9" x 12" are employed, approximately nine inches thick, whereas the wall 18 shown in Figure 6, is approximately twelve inches thick. It will be apparent to those skilled in the art that the invention may be carried out with considerable variation in the individual features or steps which I have disclosed; also the shape, size and manner of wrapping, enclosing, and boxing a group of slabs may be varied within my invention.

I do not wish therefore to be limited to the detailed features, steps, and devices which I have disclosed, except as the same are recited in the appended claims.

1. The method of fabricating and applying plastic refractory for forming fire resisting walls, which comprises kneading and tempering a plastic refractory to a consistency stiff enough to hold its shape to prevent bonding of detached masses except by tamping, forming the refractory into flat substantially rectangular slabs, assembling and wrapping a pile of slabs with their flat sides against each other into a package of such size as to be transported readily and without bonding together of the slabs in the package, transporting the slabs in such packaged condition to the place of use, and applying the slabs from said package and tamping the same into bonding engagement with each other to form a wall.

2. The method of preparing and applying plastic refractory for forming fire resisting walls, which comprises forming substantially rectangular slabs of a plastic refractory of relatively stiff consistency to prevent sticking together and to cause them to retain their shape, assembling and wrapping in a moisture retaining container a rectangular pile of slabs having their flat sides against each other, transporting the slabs in such moisture retaining container to the place of use, applying the slabs and tamping the same into bonding engagement with each other to form a wall.

3. The method of preparing a plastic refractory for use in building fire walls, lining, and the like, which comprises kneading and tempering a refractory to form a stiff plastic mass capable of retaining its shape and not subject to bonding by contact, forming the refractory into flat substantially rectangular slabs, assembling said slabs with their flat sides in contact to form a pile, enclosing the pile in a moisture retaining wrapper and allowing the slabs to age in the presence of each other within said moisture retaining wrapper to attain an evenness of temper and uniformity of plasticity.

4. The method of making a refractory wall which comprises kneading and tempering a plastic refractory to a consistency stiff enough to prevent bonding of detached masses upon mere contact with each other and to cause such masses to retain their form said consistency permitting such detached masses to be readily bonded by tamping, forming the refractory into flat, substantially rectangular slabs of a substantially uniform thickness small enough that a pair of superposed slabs may be tamped into bonding engagement without undue lateral expansion, then laying the slabs so that they rest on their flat sides edge to edge to form a wall of successive layers, and successively tamping each slab to bond it to the layer below and to bond adjacent slabs to each other edgewise in the same layer.

5. The method of making a refractory wall which comprises kneading and tempering a plastic refractory to a consistency stiff enough to prevent bonding of detached masses upon mere contact with each other and to cause such masses to retain their form, said consistency permitting such detached masses to be readily bonded by tamping, forming the refractory into flat, substantially rectangular slabs of a substantially uniform thickness small enough that a pair of superposed slabs may be tamped into bonding engagement without undue lateral expansion, then laying the slabs so that they rest on their flat sides edge to edge to form a wall of successive layers, and tamping each layer to bond the slabs of each layer to the layer below and to each other edgewise in the same layer, then firing the wall to harden the same.

6. The method of making a fire resisting wall which comprises kneading and tempering a plastic refractory to a consistency stiff enough to prevent bonding of detached masses upon mere contact with each other and to cause such masses to retain their form, said consistency permitting such detached masses to be readily bonded by tamping, forming the refractory into flat, substantially rectangular slabs of a thickness small enough that a pair of superposed slabs may be tamped into bonding engagement without undue lateral expansion, assembling a plurality of slabs into a stack capable of being handled by one man, transporting said stack to the place of use, then laying the slabs from the stack so that they rest on their flat sides edge to edge to form a wall of successive layers, and tamping each layer to bond the slabs of each layer to the layer below and to each other edgewise in the same layer.

7. The method of making a fire resisting wall which comprises kneading and tempering a plastic refractory to a consistency stiff enough to prevent bonding of detached masses upon mere contact with each other and to cause such masses to retain their form, said consistency permitting such detached masses to be readily bonded by tamping, forming the refractory into flat, substantially rectangular slabs of a thickness small enough that a pair of superposed slabs may be tamped into bonding engagement without undue lateral expansion, assembling a plurality of slabs into a stack capable of being handled by one man, transporting said stack to the place of use, then laying the slabs from the stack so that they rest on their flat sides edge to edge to form a wall of successive layers, and tamping each layer to bond the slabs of each layer to the layer below and to each other edgewise in the same layer, then firing the wall to harden the same.

8. The method of forming a monolithic fire resisting wall which comprises, kneading and tempering a plastic refractory to a consistency stiff enough to retain its own shape and to prevent bonding of detached masses except by tamping, forming the refractory into flat substantially rectangular slabs having one lateral dimension substantially equal to the wall thickness to be formed, confining a plurality of said slabs in a moisture retaining container to diffuse and equalize the moisture content of said slabs without bonding, then removing said slabs from said container and piling them into a wall and successively tamping each of said slabs to bond to form a monolithic wall, of a thickness determined by the lateral dimensions of the superposed slabs.

JOHN E. ANDERSON.